June 24, 1930.  J. B. BYRON  1,767,741
FISHING TOOL
Filed March 19, 1928
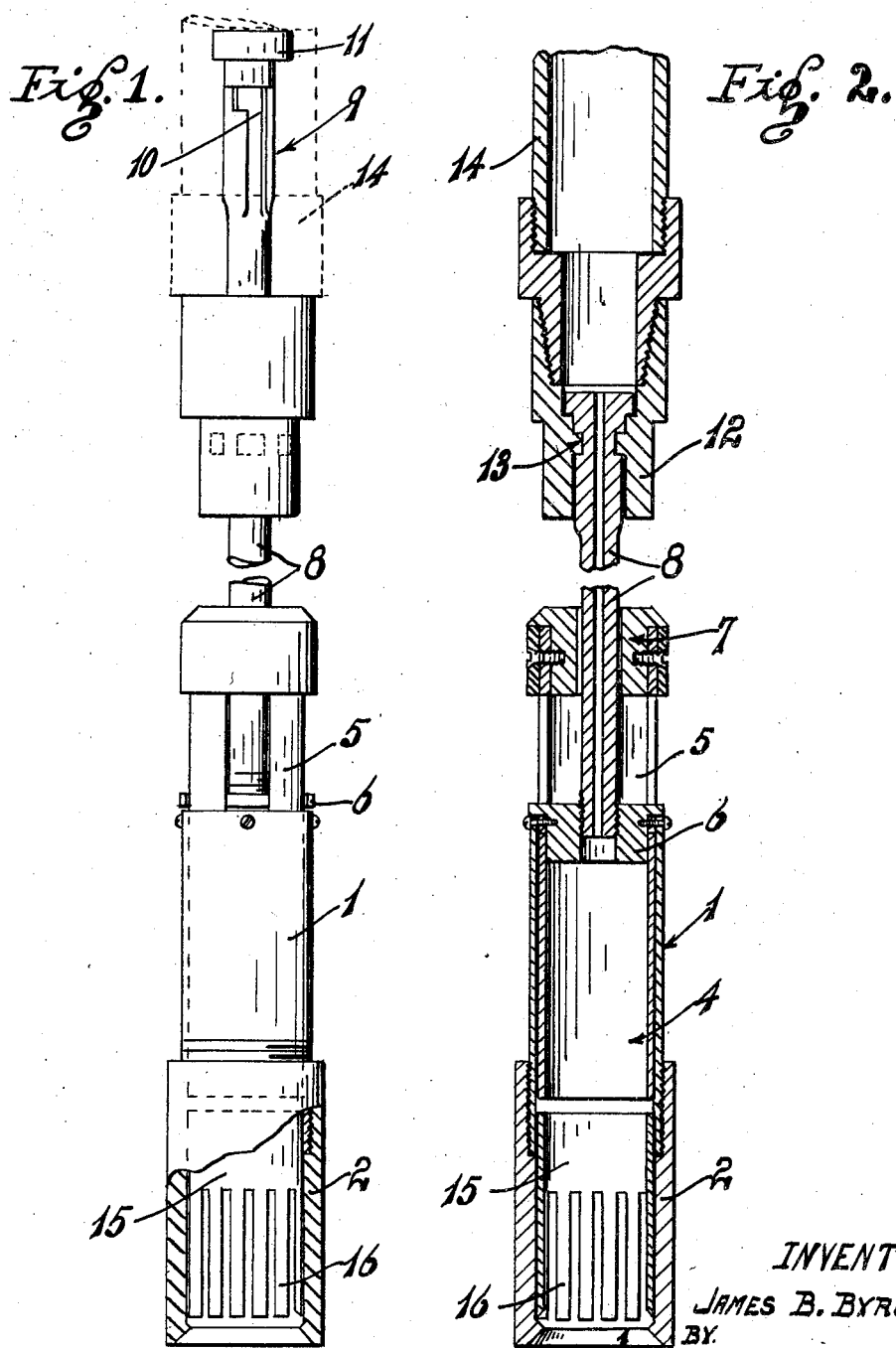
INVENTOR.
JAMES B. BYRON.
BY
ATTORNEY.

Patented June 24, 1930

1,767,741

UNITED STATES PATENT OFFICE

JAMES B. BYRON, OF LONG BEACH, CALIFORNIA

FISHING TOOL

Application filed March 19, 1928. Serial No. 262,674.

This invention relates to a fishing tool by means of which small objects can be recovered from the bottom of a well.

An object of my invention is to provide a fishing tool which can be advanced into the ground similarly to a bit so that the collapsible member can be placed below the object which rests on the bottom of the hole.

Another object is to provide a fishing tool which is actuated by the weight of the drill pipe above it.

A further object is to provide a fishing tool which when once set by the weight of the drill pipe will remain in closed position until withdrawn from the well.

Other objects, advantages, and features of invention may appear from the accompanying drawing, the subjoined detailed description, and the appended claims.

In the drawing:

Fig. 1, is a side elevation of my fishing tool with parts broken away to show interior construction.

Fig. 2, is a longitudinal, sectional view of the same.

Referring more particularly to the drawing:

The numeral 1 indicates a pipe section to the bottom of which is threaded a shoe 2. The bottom opening 3 in the shoe 2 is constricted, the purpose of which will be further described. A sleeve 4 is slidably mounted within the pipe 1 and a plurality of arms 5 project upwardly from the sleeve 4 through a nut 6. A block 7 is secured to the top of the arms 5 for purposes to be further stated. The pipe 1 is pinned or otherwise secured to the nut 6, said pins being positioned between the arms 5.

A hollow rod 8 screws into the nut 6 and extends through and is guided by the block 7, and on the top of the rod I provide a left turn release 9 which consists of a plurality of longitudinally extending bayonet slots 10 and a stop collar 11, which stop collar is formed on the top of the rod 8. A fitting 12 is provided with a plurality of keyes 13, which keys fit into the bayonet slots 10 and when the fitting is rotated counter-clockwise the keys will move into a position so that the fitting can slide along the rod 8. The stop collar 11 limits the upward movement of the fitting 12. The usual drill pipe 14 screws into the fitting 12 and thus it will be seen that when the drill pipe is rotated to the left, the fitting 12 will be released and the drill pipe can be lowered until it rests upon the block 7 and when the weight is set on the block, the sleeve 4 will be pushed downwardly in the pipe 1.

A gripping member 15, the lower end of which is provided with a plurality of fingers 16, fits within the shoe 2 and the sleeve 4 is adapted to engage the top of the gripping member 15 and when the weight of the drill pipe rests upon the sleeve 4 it will push the member 15 downwardly, thus projecting the fingers 16 out through the constricted opening 3. The opening 3 being constricted will cause the fingers 16 to contract and engage the lost object in the well.

The method of operation is as follows: The tool is lowered into the well at the bottom of the drill pipe and the pipe is rotated clockwise, thus forcing the shoe 2 into the formation for a distance of approximately four or six inches. The drill pipe is now rotated counter-clockwise and lowered until it engages the block 7 and the sleeve 4 is then lowered in the pipe 1, which forces the gripping member 15 downwardly, and the fingers 16 project through the constricted opening 3 and contract below the lost object. The tool is now removed and the object recovered from the well.

Having described my invention, I claim:

1. A fishing tool adapted to be secured to the drill pipe comprising a pipe, a shoe on said pipe, a contractable tool engaging member in the shoe, releasable coupling means between the tool and drill pipe, and means engageable by the drill pipe when released, whereby the contractable member in the shoe is engaged and contracted about the lost article in the well.

2. A fishing tool adapted to be secured to the drill pipe comprising a pipe, a shoe on said pipe, a contractable tool engaging member in the shoe, a sleeve in the pipe adapted to engage the tool engaging member, releasable coupling means between the tool and drill pipe, said drill pipe being adapted to engage the sleeve and lower the same in the pipe to contract the tool engaging member in the shoe about the lost article in the well.

3. A fishing tool adapted to be secured to the drill pipe comprising a pipe, a shoe on said pipe, a tool engaging member in the shoe, fingers on the tool engaging member, said shoe having a constricted opening in the bottom thereof through which the said fingers are adapted to extend and contract about the lost article in the well, releasable coupling means between the tool and drill pipe, and means engageable by the drill pipe when released whereby the tool engaging member is moved downwardly and the fingers contracted.

4. A fishing tool adapted to be secured to the drill pipe comprising a pipe, a shoe on said pipe, a tool engaging member in the shoe, fingers on the tool engaging member, said shoe having a constricted opening in the bottom thereof through which said fingers are adapted to extend and contract about the lost article in the well, releasable coupling means between the tool and drill pipe, a sleeve in the pipe adapted to engage the tool engaging member, said sleeve being adapted to be engaged by the drill pipe when released whereby the sleeve is lowered and the fingers projected through the opening to contract the same about the lost articles in the well.

5. A fishing tool adapted to be secured to the drill pipe comprising a pipe, a shoe screwed onto said pipe, a tool engaging member in the shoe, fingers on the tool engaging member, said shoe having a constricted opening in the bottom thereof, a sleeve in the pipe adapted to engage the tool engaging member, releasable coupling means between the tool and drill pipe, the drill pipe being adapted to engage the sleeve when released from the coupling to lower the sleeve and project the fingers through the opening to contract said fingers about the lost article in the well.

6. A fishing tool adapted to be secured to the drill pipe comprising a pipe, a shoe screwed onto said pipe, a tool engaging member in the shoe, fingers on the tool engaging member, said shoe having a constricted opening in the bottom thereof, a sleeve in the pipe adapted to engage the tool engaging member, fingers rising from the sleeve, a nut through which the fingers extend, a block secured to the fingers, a hollow rod screwed into the nut and extending through the block, releasable coupling means on the rod to which the drill pipe is secured, said drill pipe being adapted to be released to engage the block and depress the sleeve to force the fingers through the opening and contract the same about the lost article in the well.

7. A fishing tool adapted to be secured to the drill pipe comprising a pipe, a shoe screwed onto said pipe, a tool engaging member in the shoe, fingers on the tool engaging member, said shoe having a constricted opening in the bottom thereof, a sleeve in the pipe adapted to engage the tool engaging member, fingers rising from the sleeve, a nut through which the fingers extend, a block secured to the fingers, a hollow rod screwed into the nut and extending through the block, said rod having bayonet slots formed at the top thereof, a fitting, keys on the fitting extending into the slots, the drill pipe being secured to the fitting, said fitting being releasable from the slots to engage the block and depress the sleeve to lower the tool engaging member, and thus force the fingers through the constricted opening to contract the fingers about the lost article in the well.

In testimony whereof, I affix my signature.

JAMES B. BYRON.